(12) United States Patent
Dundas et al.

(10) Patent No.: US 9,166,970 B1
(45) Date of Patent: Oct. 20, 2015

(54) DYNAMIC FRAMEWORK FOR CERTIFICATE APPLICATION CONFIGURATION

(71) Applicant: Symantec Corporation, Mountain View, CA (US)

(72) Inventors: Alan Dundas, Los Altos Hills, CA (US); Eirik Herskedal, Fort Wayne, IN (US); Thomas Harning, Huntertown, IN (US); Aaron Diers, Fort Wayne, IN (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/896,504

(22) Filed: May 17, 2013

Related U.S. Application Data

(60) Provisional application No. 61/792,690, filed on Mar. 15, 2013.

(51) Int. Cl.
*H04L 29/06* (2006.01)

(52) U.S. Cl.
CPC .................................. *H04L 63/0823* (2013.01)

(58) Field of Classification Search
CPC .................................................. H04L 63/0823
USPC .......................................................... 713/156
See application file for complete search history.

(56) References Cited

U.S. PATENT DOCUMENTS

| | | | |
|---|---|---|---|
| 6,072,876 A | 6/2000 | Obata et al. | |
| 6,148,404 A | 11/2000 | Yatsukawa | |
| 6,202,150 B1 | 3/2001 | Yong et al. | |
| 6,253,193 B1 | 6/2001 | Ginter et al. | |
| 6,691,232 B1 | 2/2004 | Wood et al. | |
| 7,065,210 B1 | 6/2006 | Tsujii et al. | |
| 7,930,554 B2 | 4/2011 | Coulier et al. | |
| 8,296,245 B2 * | 10/2012 | Barber et al. | 705/325 |
| 8,340,287 B2 | 12/2012 | Sandhu et al. | |
| 8,422,670 B2 | 4/2013 | Shin et al. | |
| 8,522,038 B2 | 8/2013 | Lu et al. | |
| 2002/0178366 A1 | 11/2002 | Ofir | |
| 2003/0093585 A1 * | 5/2003 | Allan | 709/330 |
| 2006/0080545 A1 | 4/2006 | Bagley | |
| 2006/0230165 A1 * | 10/2006 | Zimmer et al. | 709/230 |
| 2007/0033392 A1 | 2/2007 | Ganesan et al. | |
| 2007/0189542 A1 | 8/2007 | Alldredge | |
| 2007/0282749 A1 | 12/2007 | Nonaka et al. | |
| 2012/0066501 A1 | 3/2012 | Xiong | |
| 2012/0198228 A1 | 8/2012 | Oberheide et al. | |
| 2013/0246796 A1 * | 9/2013 | Lichtenstadt et al. | 713/176 |

OTHER PUBLICATIONS

USPTO; Office Action for U.S. Appl. No. 13/918,269, mailed Sep. 23, 2013.

(Continued)

*Primary Examiner* — Peter Shaw
(74) *Attorney, Agent, or Firm* — Lowenstein Sandler LLP

(57) ABSTRACT

A script hosting server receives a script from an authenticated source, associates the script with a certificate profile for digital certificates based on input from the authenticated source, receives user enrollment information for the certificate profile from the authenticated source, receives a script request of a client device, the script request identifying the certificate profile and a user of the client device, determines whether the user is enrolled in the certificate profile based on the user enrollment information, and, upon determining that the user is enrolled, providing the scripts to the client device.

18 Claims, 6 Drawing Sheets

(56) References Cited

OTHER PUBLICATIONS

USPTO; Office Action for U.S. Appl. No. 13/918,326, mailed Sep. 5, 2013.
USPTO; Office Action for U.S. Appl. No. 13/918,326, mailed Jan. 13, 2014.
Office Action for U.S. Appl. No. 13/918,269 mailed Oct. 31, 2014.
Office Action for U.S. Appl. No. 13/918,269 mailed Apr. 21, 2014.

* cited by examiner

DYNAMIC FRAMEWORK FOR CERTIFICATE APPLICATION CONFIGURATION

CROSS-REFERENCE TO RELATED APPLICATIONS

The present application claims the benefit of U.S. Provisional Application No. 61/792,690, entitled DYNAMIC FRAMEWORK FOR CERTIFICATE APPLICATION CONFIGURATION, filed Mar. 15, 2013, the entire content of which is incorporated herein by reference.

TECHNICAL FIELD

Embodiments of the present invention relate to digital certificates, and particularly to digital certificate application configuration.

BACKGROUND

Enterprises can control user access to enterprise applications, such as web applications, by authenticating users via user credentials, such as a username and password. Enterprises may wish to provide a more secure environment by implementing strong authentication, also known as second-factor authentication. Second-factor authentication requires a user to provide additional evidence of who they are, for example, via a digital certificate (e.g., a public key infrastructure (PKI) certificate). Enterprises can develop proprietary applications to integrate a strong authentication service provider into an existing application infrastructure. For example, an enterprise can integrate second-factor authentication via digital certificates. However, the enterprise applications, such as virtual private network (VPN) applications and secure/multipurpose internet mail extensions (S/MIME) applications, typically require configuration for using digital certificates and for a root certificate to be installed on a client computer. A root certificate may be part of a trusted set of certificates known to both the issuer of a digital certificate (Certificate Authority) and the recipient of the digital certificate. Upon receiving the digital certificate, the recipient may verify that the digital certificate chains up to a trusted root certificate. If the received digital certificate chains up to a trusted root certificate, the recipient will trust and use the digital certificate. Otherwise, the recipient may discard the digital certificate and request another digital certificate.

SUMMARY

In one implementation, a system for a dynamic framework for certificate application configuration is described. An example system can include a computer system that includes a server comprising a memory and a processing device coupled to the memory that receives one or more scripts from an authenticated source, associates the script with a digital certificate profile for digital certificates based on input from the authenticated source, and receives user enrollment information for the certificate profile from the authenticated source. The computer system receives a script request of a client device, the script request identifying the certificate profile and a user of the client device, and determines whether the user of the client device is enrolled in the certificate profile based on the user enrollment information. Upon determining that the user is enrolled, the computer system provides the scripts to the client device.

In one implementation, the computer system digitally signs the script with a digital signature. In one implementation, the script is digitally signed by the authenticated source. In one implementation, the request for the script is received in response to a certificate lifecycle event, which can be one of enroll, renew, or import. In one implementation, the script comprises a script for automatic application configuration. In one implementation, the authenticated source is a strongly authenticated source.

Further, a method for a dynamic framework for certificate application configuration is described. In one implementation, the method includes receiving one or more scripts from an authenticated source. The method also includes associating the script with a certificate profile for digital certificates based on input from the authenticated source. The method also includes receiving user enrollment information for the certificate profile from the authenticated source. The method includes receiving a script request of a client device, the script request identifying the certificate profile and a user profile of the client device, and determining whether the user is enrolled in the certificate profile based on the user enrollment information. The method also includes, upon determining that the user is enrolled, providing the scripts to the client device In addition, a non-transitory computer readable storage medium for providing a framework for certificate application configuration is described. An example non-transitory computer readable storage medium includes instructions that will cause the processing device to perform a set of operations that include receiving one or more scripts from an authenticated source, associating the script with a certificate profile for digital certificates based on input from the authenticated source, receiving user enrollment information for the certificate profile from the authenticated source, receiving a script request of a client device, the script request identifying the certificate profile and a user of the client device, determining whether the user is enrolled in the certificate profile based on the user enrollment information, and upon determining that the user is enrolled, providing the scripts to the client device.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments are directed to a method and system for a dynamic framework for certificate application configuration. In one embodiment, a script hosting server receives a script from an authenticated source, such as a strongly authenticated administrator, associates the script with a certificate profile of a digital certificate based on input from the authenticated source, and receives a user enrollment for the digital certificate from the authenticated source. The script hosting server can also digitally sign the script.

In one embodiment, the script hosting server can receive a request for the script associated with a certificate profile from an application on a client device, and determine whether the user of the client device is enrolled in the user enrollment. Upon determining that the user is enrolled, the script hosting server sends the script to the application on the client device. The script can then automatically configure the application.

For example, a framework is provided for performing custom actions after a certificate lifecycle event, such as an enrollment, a renewal, or an import in an end user machine or device (e.g., a client device). Here, one or more scripts can be uploaded, e.g., to a web service, and associated with a certificate profile of a digital certificate. In response to a certificate lifecycle event (i.e., when the digital certificate is enrolled, renewed, or imported with a client application), the client application will dynamically download and execute the associated script, e.g., from the web service. Further, the scripts can be digitally signed to prevent malicious scripts from being executed on the client.

According to embodiments, rather than the administrator needing to statically distribute and install applicable scripts on client devices for different types of digital certificates, the client devices can dynamically obtain one or more scripts for applicable certificate profiles, leading to both cost and time savings.

Figure 1:
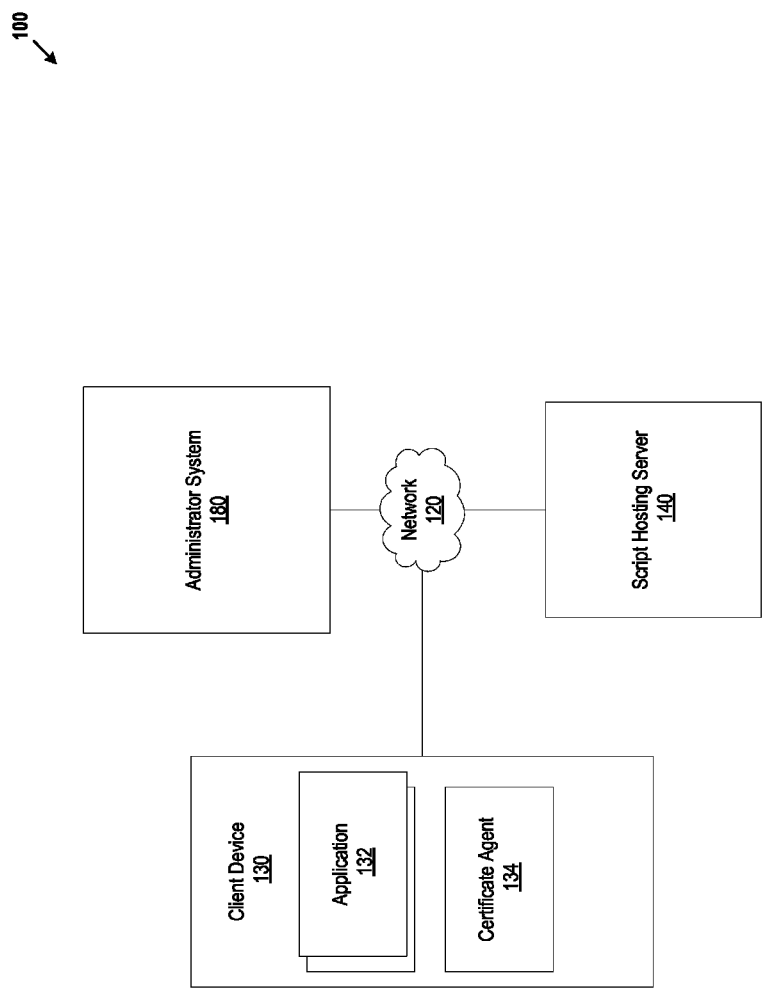
FIG. 1 illustrates a network architecture in which embodiments may operate.

FIG. 1 is one embodiment of a network architecture 100 in which embodiments of the present invention can be implemented. The network architecture 100 can include an administrator system 180. An administrator can use the administrator system 180 to access a script hosting server 140 via a network 120. The network 120 can be a local area network (LAN), a wireless network, a mobile communications network, a wide area network (WAN), such as the Internet, or similar communication system. The network 120 can include any number of networking and computing devices such as wired and wireless devices. The network architecture 100 also includes multiple client devices including a client device 130 of a user. The client device 130 and the administrator system 80 may be part of an organization's network. In addition, the script hosting server 140 may be part of the organization's network (a private cloud) or part of a public cloud (computing resources provided to the organization by a third party).

The administrator system 180 and the script hosting server 140 can be hosted by any type of computing device including server computers, gateway computers, desktop computers, laptop computers, hand-held computers or similar computing devices. The client device 130 can be hosted by any type of computing device including desktop computers, laptop computers, tablet computers, mobile communications devices, cell phones, smart phones, hand-held computers, or similar computing devices.

The client device 130 includes one or more applications 132 that may use digital certificates (e.g., public key infrastructure (PKI) certificates) when sending messages to other devices within the organization's network and/or outside the organization's network. Examples of these applications are VPN applications and email (e.g., secure/multipurpose internet mail extensions (S/MIME)) applications. Applications 132 can require configuration for using digital certificates and can also require a root certificate to be installed on the client device 130 for the digital certificates to be trusted. Each digital certificate is associated with a specific certificate profile. A certificate profile defines characteristics of a digital certificate (e.g., authentication method, authorization method, certificate content, etc.). Applications 132 can be configured differently for different certificate profiles. In addition, applications 132 may need to be reconfigured in response to a certificate lifecycle event (e.g., when the certificate profile is enrolled, renewed or imported with application 132). Each configuration or reconfiguration can be done via a respective script provided by the administrator. Conventionally, an administrator has to determine what digital certificates are needed by a certain client device, install scripts for these digital certificates on the client device, keep track of certificate lifecycle events, and install new scripts for detected certificate lifecycle events.

Embodiments of the present invention overcome the above deficiencies of the conventional solutions by uploading the scripts from the administrator system 180 to the script hosting server 140 and associating the scripts with a certificate profile for a digital certificate. For example, the scripts can contain administrator-provided instructions regarding the configuration of the client device 130, such as Batch (i.e., .bat) instructions for Microsoft Windows operating systems, Bourne Shell (i.e., .sh) instructions for Mac OSX operating systems, or other script types. The script hosting server 140 distributes the scripts, e.g., with strongly mutually authenticated flow to protect script authenticity and prevent accidental rogue script distribution, to the client device 130 when requested by a certificate agent 134. More than one script can be uploaded and/or associated with one or more certificate profiles. A certificate lifecycle event, such as an enrollment, a renewal, or an import of the digital certificate, can trigger the application 132 to request the download of the one or more scripts to the client device 130.

For example, the administrator can create or edit a script, e.g., a custom script needed by the application 132 for automatic application configuration, on an administrator system 180. Once the administrator creates or edits the script, the script can optionally be digitally signed for an integrity check by the certificate agent 134 and the script hosting server 140, where the signer can be a source (certificate authority) trusted by the client device 130 and the script hosting server 140.

The administrator can then upload the script to the script hosting server 140 (e.g., a public key infrastructure (PKI) manager) from the administrator system 180 to be executed in conjunction with a certificate lifecycle event. The administrator can be strongly authenticated by the script hosting server 140 so that the content of the script can be trusted and traced for audit purposes when the script is distributed.

In one embodiment, the script hosting server 140 can be implemented as a cloud service provider to provide strong authentication solutions to one or more enterprise environments 105 using a cloud computing and SaaS (software as a service). The script hosting server 140 can optionally validate the updated script integrity to confirm that it is from the administrator system 180.

The script can be digitally signed with a digital signature by a signature key available in the script hosting server 140. This digital signature can be used when the script is later downloaded by a client device 130.

The administrator then associates the script with a certificate profile for a digital certificate and enrolls one or more users for the digital certificate. The administrator can update the scripts associated with a certificate profile at any point in time. The script will then be dynamically distributed for digital certificates corresponding to the certificate profile. The digital certificate can be a Public Key Infrastructure (PKI)

certificate that is issued by a certificate authority. For example, the digital certificate can be a X.509 digital certificate.

The user can login to the certificate agent 134 via the client device 130 (e.g., using first-factor credentials, such as a user ID (identifier) and password. When the user completes a certificate lifecycle event (e.g., enrolling or renewing a digital certificate) on the client device 130, the certificate agent 134 requests from the script hosting server 140 any scripts associated with the certificate profile of the digital certificate for which the user was enrolled in the user enrollment.

The script hosting server 140 can validate a user and/or client device 130 (e.g., based on user information such as a user ID and/or password) to determine whether to grant the certificate agent 134 access to the scripts based on the certificate profile and the user enrollment. If the user is validated, the scripts can be downloaded to the client device via a secure authenticated service channel, e.g., HTTPs. If the script has been digitally signed with a digital signature, then the certificate agent 134 can then validate the digital signature on the script. The script will then be executed, e.g., by the certificate agent 134, on the client device 130 with the relevant certificate information, e.g., to perform the application configuration.

Figure 2:
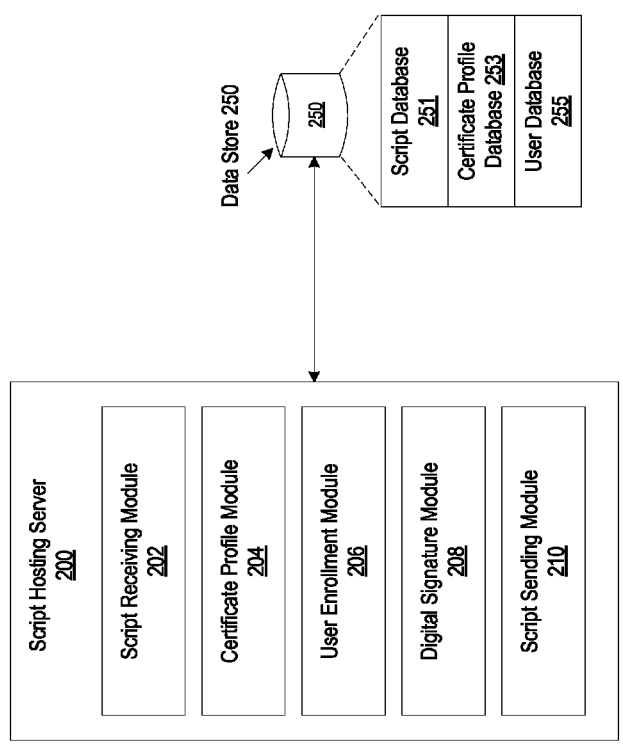
FIG. 2 illustrates a block diagram of a script hosting server of one embodiment.

FIG. 2 is a block diagram of a script hosting server 200 and a data store 250 according to one embodiment. The script hosting server 200 may be the same as the script hosting server 140 in FIG. 1. The script hosting server 200 includes a script receiving module 202, a certificate profile module 204, a user enrollment module 206, a digital signature module 208, and a script sending module 210. The modules can be combined together or separated in further sub-modules, according to a particular embodiment. The data store 250 includes a script database 251, a certificate profile database 253, and a user database 255.

A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The script receiving module 202 of the script hosting server 200 receives a script from an administrator and stores the script in a script database 251 in the data store 250. The certificate profile module 204 receives a script association to one or more certificate profiles for a digital certificate from the administrator and stores the script association in the certificate profile database 253 in the data store 250. The user enrollment module 206 receives a user enrollment of approved users for the certificate profile from the administrator and stores the user enrollment in the user database 255 in the data store 250.

The user database 255 can describe other data pertaining to a user, such as a user level (e.g., Premium level user, Basic level user), a user role (e.g., administrator role, user role), a user identifier, a hash algorithm associated with the user. The user data 255 can also include second-factor authentication user data, such as mapping data that associates user second-factor challenges (e.g., requests for digital certificates) and corresponding client devices with a user ID.

In one embodiment, the digital signature module 208 can digitally sign an upload script in the script database 251 with a digital signature based on a signature key.

The script sending module 210 can receive a request from a certificate agent on a client device on behalf of a user for any scripts associated with a certificate profile for which the user is enrolled in response to a certificate lifecycle event.

The user enrollment module 206 can determine the certificate profile(s) for which the user is enrolled in the user database 255. The certificate profile module 204 can then determine the scripts that are associated with these certificate profiles in the certificate profile database 253. The script sending module 210 can then send these scripts to the client device for execution by the certificate agent.

Figure 3:
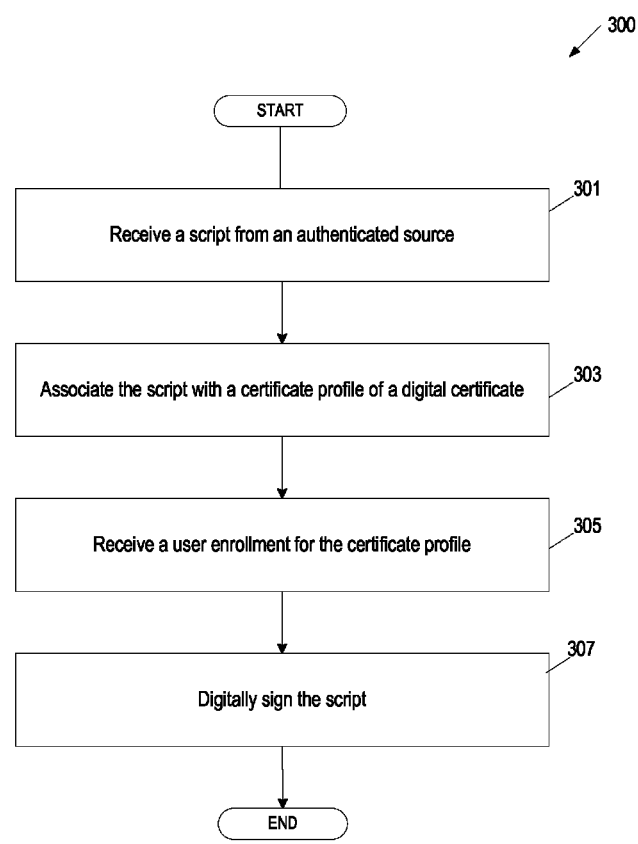
FIG. 3 is a flow diagram of a method for dynamic script upload of one embodiment.

FIG. 3 is a flow diagram of an embodiment of a method for dynamic script upload of one embodiment. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by the script hosting server 200 of FIG. 2.

At block 301, a script hosting server receives a script from an administrator. For example, the script can be a custom script for configuration of an application on a client device. The script hosting server stores the script.

At block 303, the script hosting server receives, from the administrator, data identifying a certificate profile corresponding to the script and associates the script with the certificate profile of a digital certificate. For example, one or more scripts can be associated with the certificate profile. In another example, a script can be associated with more than one certificate profile. Further, the administrator can change scripts or update scripts dynamically as requirements change. The script hosting server stores the association of the script with the certificate profile.

At block 305, the script hosting server receives a user enrollment for the certificate profile from the administrator. For example, the user enrollment can include a list of users that are approved for use of digital certificates having a certain certificate profile by the administrator. The administrator can change the user enrollment at needed, e.g., to add new users or remove users that are no longer approved. The script hosting server stores the user enrollment in association with the scripts of corresponding certificate profiles.

At block 307, the script hosting server digitally signs the script with a digital signature, according to one embodiment. For example, the digital signature can be a mathematical scheme for demonstrating authenticity of the script providing the user receiving the script with a digital signature evidence that the script was created by a known sender and not altered in transit. The script can be digitally signed by first using a key generator algorithm to generate a private key, outputting the private key and a public key and using a signing algorithm to sign the script. A signature verification algorithm can later be used with the script, the digital signature, and the public key by the client device to accept or reject the authenticity of the script. The digital signature can be stored with the script by the script hosting server.

Figure 4A:
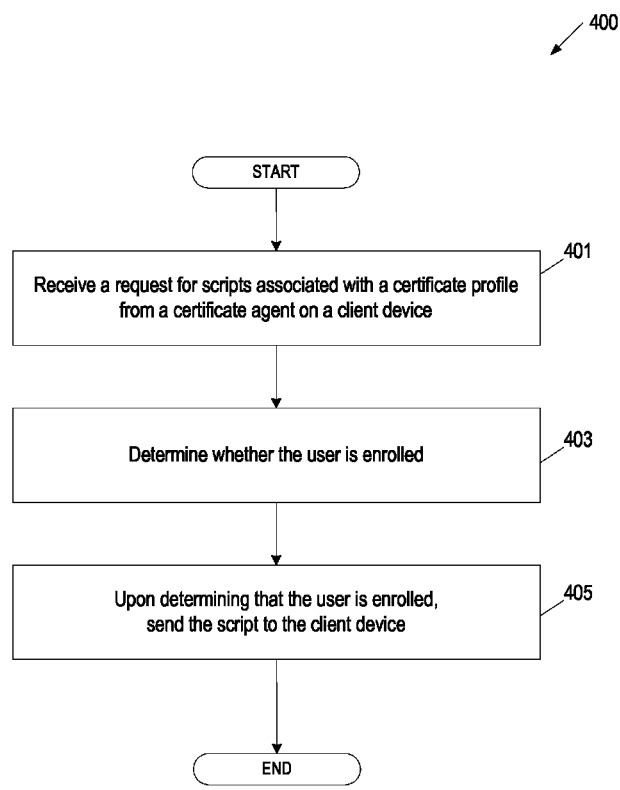
FIG. 4A is a flow diagram of a method of script sending of one embodiment.

FIG. 4A is a flow diagram of a method of script sending of one embodiment. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the script hosting server 200 of FIG. 2.

At block 401, the script hosting server receives a request for scripts associated with a certificate profile from a certificate agent on the client device. Returning to FIG. 1, for example, after a certificate lifecycle event, the application 132 on the client device 130 queries the script hosting server 140 for any scripts, e.g., custom scripts for configuration of the application 132, that are associated with the certificate profile.

At block 403, the script hosting server determines whether the user of the client device is enrolled for the certificate profile based on user information such as a user ID. For example, the script hosting server determines whether the administrator enrolled the user in the user enrollment.

At block 405, upon determining that the user is enrolled, the script hosting server sends the script to the client device. Upon determining that the user is not enrolled, the script sending module 210 of the script hosting server 200 does not send the script to the client device.

For example, returning to FIG. 1, the script can be downloaded to the client device 130 from the script hosting server 140 via a secure authenticated service channel (e.g., HTTPs). Once the script is downloaded, the client device 130 can validate the digital signature on the script (e.g., by a signature verification algorithm) to verify that the script is authentic and has not been modified.

Once the digital signature has been validated, the script can be executed on the client device 130 by the application 132 with the relevant certificate information. For example, the script can be executed for configuration of the application. In one example, the application is a VPN application or an S/MIME application that is configured by the script.

Figure 4B:
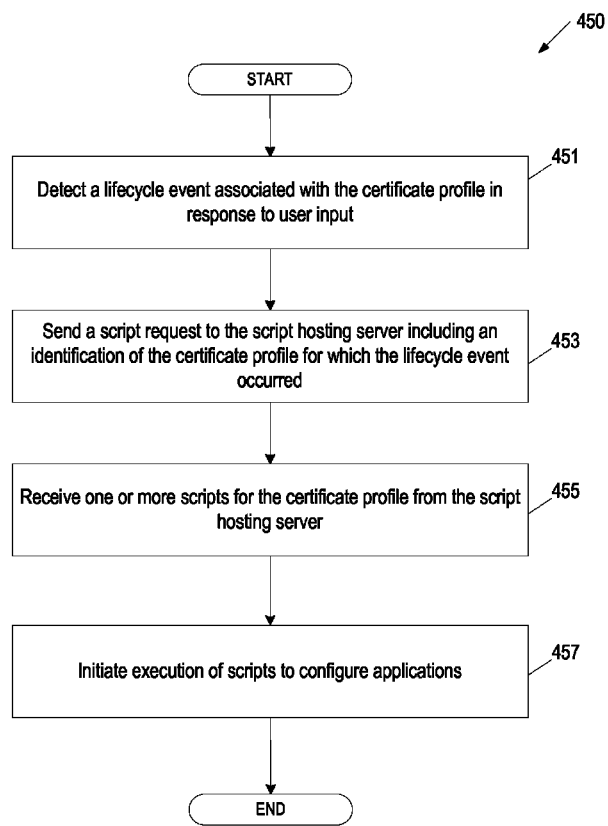
FIG. 4B is a flow diagram of a method of requesting and receiving a script of one embodiment.

FIG. 4B is a flow diagram of a method of script requesting and receiving of one embodiment. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the certificate agent 134 of FIG. 1.

At block 451, the certificate agent detects a lifecycle event (e.g., enroll, renew, or import) associated with the certificate profile in response to user input. For example, if the user initiates a renewal of a digital certificate, then the certificate agent detects this renewal initiation as a lifecycle event.

At block 453, the certificate agent sends a script request to the script hosting server which includes an identification of the certificate profile for which the lifecycle event occurred.

At block 455, the certificate agent receives one or more scripts for the certificate profile from the script hosting server.

At block 457, the certificate agent initiates an execution of the received scripts to configure one or more applications.

Figure 5:
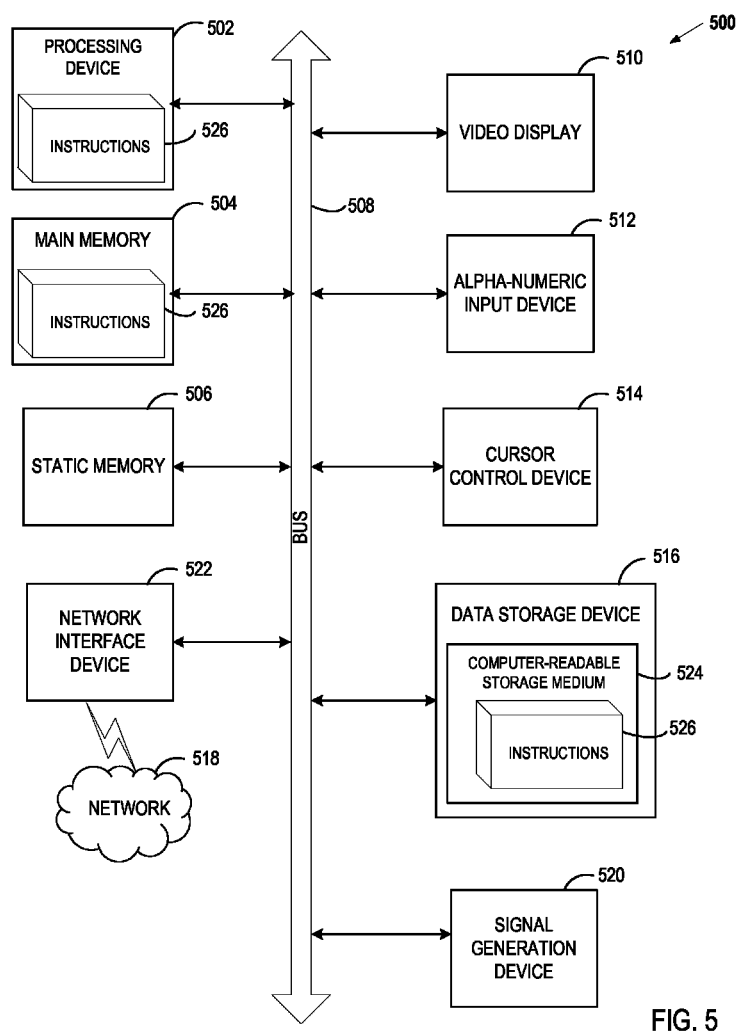
FIG. 5 is a diagram of one embodiment of a computer system that may perform one or more of the operations described herein.

FIG. 5 is a diagram of one embodiment of a computer system for providing a dynamic framework for certificate application configuration. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable storage medium), which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media. The instructions 526 may further be transmitted or received over a network 518 via the network interface device 522.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 526, components and other features described herein (for example in relation to FIG. 2) can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving, by a script hosting server, a script from an authenticated source;
storing, by the script hosting server, the script in a script database;
associating, by the script hosting server, the script with a certificate profile for a digital certificate based on input from the authenticated source, wherein more than one script can be associated with the certificate profile;
receiving, by the script hosting server, user enrollment information for the certificate profile from the authenticated source, wherein the user enrollment information indicates an enrolled user for the certificate profile;
storing the user enrollment information in a user database;
receiving, by the script hosting server, a script request of a client device, the script request identifying the certificate profile and a user of the client device;
determining, by the script hosting server, whether-when the user is enrolled in the certificate profile based on the user enrollment information in the user database; and
upon determining that the user is enrolled, providing the associated one or more scripts to the client device.

2. The method of claim 1 further comprising digitally signing the associated one or more scripts one or more scripts with a digital signature.

3. The method of claim 1, wherein the associated one or more scripts are digitally signed by the authenticated source.

4. The method of claim 1, wherein the request for the associated one or more scripts is received in response to a certificate lifecycle event.

5. The method of claim 4, wherein the certificate lifecycle event is any one of enrolling, renewing, or importing the digital certificate.

6. The method of claim 1, wherein the associated one or more script are to automatically configure an application.

7. A system comprising:
a server comprising a memory and a processing device coupled to the memory, the processing device is to:
receive a script from an authenticated source;
store the script in a script database;
associate the script with a certificate profile for a digital certificate based on input from the authenticated source, wherein more than one script can be associated with the certificate profile;
receive user enrollment information for the certificate profile from the authenticated source, wherein the user enrollment information indicates an enrolled user for the certificate profile;
store the user enrollment information in a user database
receive a script request of a client device, the script request identifying the certificate profile and a user of the client device;

determine whether-when the user is enrolled in the certificate profile based on the user enrollment information; and upon determining that the user is enrolled, providing the associated one or more scripts to the client device.

8. The system of claim 7 further comprising a client device executing a security agent, wherein the security agent is to: detect a lifecycle event associated with the certificate profile in response to user input; receive the associated one or more scripts; and initiate execution of the associated one or more scripts to configure an application.

9. The system of claim 7, wherein the associated one or more scripts are digitally signed by the authenticated source.

10. The system of claim 7, wherein the request for the associated one or more scripts is received in response to a certificate lifecycle event.

11. The system of claim 7, wherein the processing device is further configured to send the digital certificate to the client device.

12. The system of claim 7, wherein the associated one or more scripts comprises a script for automatic application configuration.

13. A non-transitory computer readable storage medium including instructions that, when executed by a processing device, cause the processing device to perform a set of operations comprising:

receiving a script from an authenticated source;

storing the script in a script database;

associating the script with a certificate profile for a digital certificate based on input from the authenticated source, wherein more than one script can be associated with the certificate profile;

receiving user enrollment information for the certificate profile from the authenticated source, wherein the user enrollment information indicates an enrolled user for the certificate profile;

storing the user enrollment information in a user database receiving a script request of a client device, the script request identifying the certificate profile and a user of the client device;

determining whether-when the user is enrolled in the certificate profile based on the user enrollment information in the user database; and upon determining that the user is enrolled, providing the associated one or more scripts to the client device.

14. The non-transitory computer readable storage medium of claim 13, wherein the set of operations further comprises digitally signing the associated one or more scripts with a digital signature.

15. The non-transitory computer readable storage medium of claim 13, wherein the associated one or more scripts are digitally signed by the authenticated source.

16. The non-transitory computer readable storage medium of claim 13, wherein the request for the associated one or more scripts is received in response to a certificate lifecycle event.

17. The non-transitory computer readable storage medium of claim 16, wherein the certificate lifecycle event is any one of enrolling, renewing, or importing the digital certificate.

18. The non-transitory computer readable storage medium of claim 13, wherein the associated one or more scripts are to automatically configure an application.

* * * * *